US012655859B1

(12) United States Patent　　　　(10) Patent No.:　US 12,655,859 B1

Wang　　　　　　　　　　　　　　　　(45) Date of Patent:　Jun. 16, 2026

(54) REVERSIBLE DOVETAIL CLAMP WITH NOTCHES

(71) Applicant: Henry Wang, Winter Springs, FL (US)

(72) Inventor:　Henry Wang, Winter Springs, FL (US)

( * ) Notice:　Subject to any disclaimer, the term of this patent is extended or adjusted under 35 U.S.C. 154(b) by 0 days.

(21) Appl. No.: 19/350,608

(22) Filed:　Oct. 6, 2025

(51) Int. Cl.
　　*F16B 2/12*　　　　(2006.01)

(52) U.S. Cl.
　　CPC ..................................... *F16B 2/12* (2013.01)

(58) Field of Classification Search
　　CPC ....... F16B 2/12; F16M 13/022; F16M 11/041; F16M 2200/028; B25B 5/006
　　See application file for complete search history.

(56)　　　　　References Cited

U.S. PATENT DOCUMENTS

| | | | | |
|---|---|---|---|---|
| 1,026,475 | A | * | 5/1912 | Tarbuck ................... B25B 5/006 |
| | | | | 269/93 |
| D248,728 | S | * | 8/1978 | Elliott .............................. D8/72 |
| 4,170,345 | A | | 10/1979 | Townsend |
| 4,989,654 | A | * | 2/1991 | Berkeley ................ B27G 5/023 |
| | | | | 144/286.5 |
| 5,181,702 | A | | 1/1993 | Pettigrew |
| 5,509,644 | A | | 4/1996 | Engibarov |
| 5,573,230 | A | * | 11/1996 | Lambertini ............... B25B 5/08 |
| | | | | 269/235 |
| 8,282,088 | B2 | * | 10/2012 | Janson .................... B25B 5/163 |
| | | | | 269/166 |
| 8,985,566 | B2 | * | 3/2015 | Chuang ................... B25B 5/068 |
| | | | | 269/6 |

| | | | | |
|---|---|---|---|---|
| 9,216,485 | B2 | | 12/2015 | Huang |
| 9,637,933 | B2 | | 5/2017 | Zhou et al. |
| 9,815,177 | B2 | * | 11/2017 | Ursell ..................... B25B 5/166 |
| 10,099,398 | B2 | * | 10/2018 | Wang ...................... B25B 5/163 |
| 10,302,249 | B1 | * | 5/2019 | Kelly ........................ B25H 1/04 |
| 10,442,058 | B2 | * | 10/2019 | Wang ...................... B25B 5/102 |
| 10,556,326 | B1 | * | 2/2020 | Kelly ......................... B25B 5/02 |
| 10,718,365 | B2 | * | 7/2020 | Lund .......................... F16B 2/14 |
| 10,738,808 | B2 | * | 8/2020 | Pryor ................. A61M 5/1415 |
| 10,746,209 | B2 | * | 8/2020 | Voegele .................. B60J 7/198 |
| 10,870,184 | B2 | * | 12/2020 | Wang ...................... B25B 5/006 |
| 10,870,185 | B2 | * | 12/2020 | Wang ...................... B25B 5/102 |
| 10,875,156 | B2 | * | 12/2020 | Wang ...................... B25B 5/003 |
| 11,005,250 | B2 | * | 5/2021 | Ciesielczyk .............. F16B 2/12 |
| 11,047,411 | B2 | * | 6/2021 | Hodges ............... F16M 13/022 |
| 11,224,964 | B2 | * | 1/2022 | Wang ...................... B25H 1/08 |
| 11,230,029 | B2 | * | 1/2022 | Wang ...................... B25B 5/102 |
| 11,255,523 | B2 | * | 2/2022 | Jackson ............. F21V 21/0885 |

(Continued)

*Primary Examiner* — Jason W San
*Assistant Examiner* — Matthew J Sullivan
(74) *Attorney, Agent, or Firm* — Wolter Van Dyke Davis, PLLC; Robert L. Wolter; Patrick Herron

(57)　　　　　　　ABSTRACT

A clamp (200), including: a clamp head (210) and a handle (204); a guide arm (220) operatively connected to the clamp head and to a first post (224), wherein the guide arm moves linearly relative to the first post; and a second post (230) at an end of the first post, disposed generally perpendicular to the first post, and parallel to the guide arm. A proximate portion (240) of a cross section of the second post that is closer to the clamp head includes an upright frustoconical shape (242) that tapers inward toward the clamp head. A distal portion (244) of the cross section is disposed away from the clamp head and fits within a taper (248) defined by an upside-down frustoconical shape (246) that is a mirror image of the upright frustoconical shape.

10 Claims, 9 Drawing Sheets

(56) References Cited

U.S. PATENT DOCUMENTS

| | | | | |
|---|---|---|---|---|
| 11,279,020 | B2 | 3/2022 | Wang | |
| 11,524,391 | B2 * | 12/2022 | Weber | F16B 2/12 |
| 11,703,744 | B2 * | 7/2023 | Chan | G03B 17/561 |
| | | | | 248/316.2 |
| 12,134,172 | B2 * | 11/2024 | Gurule | B25B 5/16 |
| 2007/0132165 | A1 | 6/2007 | Hughes | |
| 2008/0127794 | A1 | 6/2008 | Jaksha | |
| 2013/0221592 | A1 | 8/2013 | Clark | |
| 2015/0343607 | A1 | 12/2015 | Wang | |
| 2020/0236799 | A1 * | 7/2020 | Roth | H04B 1/3888 |
| 2020/0253405 | A1 * | 8/2020 | Da Silva Romero | |
| | | | | A47G 23/0208 |
| 2020/0338717 | A1 | 10/2020 | Pugh | |

* cited by examiner

REVERSIBLE DOVETAIL CLAMP WITH NOTCHES

TECHNICAL FIELD

This invention relates generally to the field of clamping devices used to temporarily secure two components together. More specifically, the invention relates to clamping devices suitable for use with a variety of differently shaped worktable slots.

BACKGROUND OF THE INVENTION

With respect to woodworking apparatuses such as cutting devices (i.e., table saws, routers, and band saws), clamps may be used to secure an auxiliary fence to an existing machine fence to provide additional surface area to support work pieces for cutting or to provide a sacrificial fence. Similarly, clamps may be used to affix wood boards to benches to increase working area space. Such auxiliary fences or boards are typically configured so the clamps engage these components and the woodworking apparatus in a manner to provide a flush and/or clear working surface.

Prior art auxiliary fences often include extruded metal (aluminum) members; however, these components are limited in size because of manufacturing cost and weight. In addition, the channels for receiving clamps extend in only one direction. That is, the extruded metal fences cannot be manufactured to include channels in multiple directions. Accordingly, woodworking enthusiasts and professionals often use wood boards as auxiliary or sacrificial fences that are adapted to receive clamps so that a flush work surface is available. More specifically, channels may be formed along edges of the board to receive a clamp post; however, the boards have a height dimension similar to that of the fence for the cutting tool and do not function well with larger wooden work pieces to be cut.

Alternatively, T-shaped grooves or channels have been formed on one side of the board to receive a T-shaped clamping post of a clamp, but the cross-sectional dimensions of these channels are not standardized, and the end users have difficulties in cutting the properly sized grooves to receive T-shaped clamping posts of a clamp. In addition, the T-shaped channels, if cut too deep may compromise the structural integrity of the work surface. If cut too shallow, the T-shaped channels form thin strips of wood on the clamp side, which strips can readily break thereby comprising the attachment of the auxiliary fence to the machine fence of the woodworking apparatus.

BRIEF DESCRIPTION OF DRAWINGS

The invention is explained in the following description in view of the drawings.

DETAILED DESCRIPTION

In describing particular features of different embodiments of the present invention, number references will be utilized in relation to the figures accompanying the specification. Similar or identical number references in different figures may be utilized to indicate similar or identical components among different embodiments of the present invention.

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7. It is to be noted that all ranges disclosed within this specification are inclusive and are independently combinable.

Figure 1:
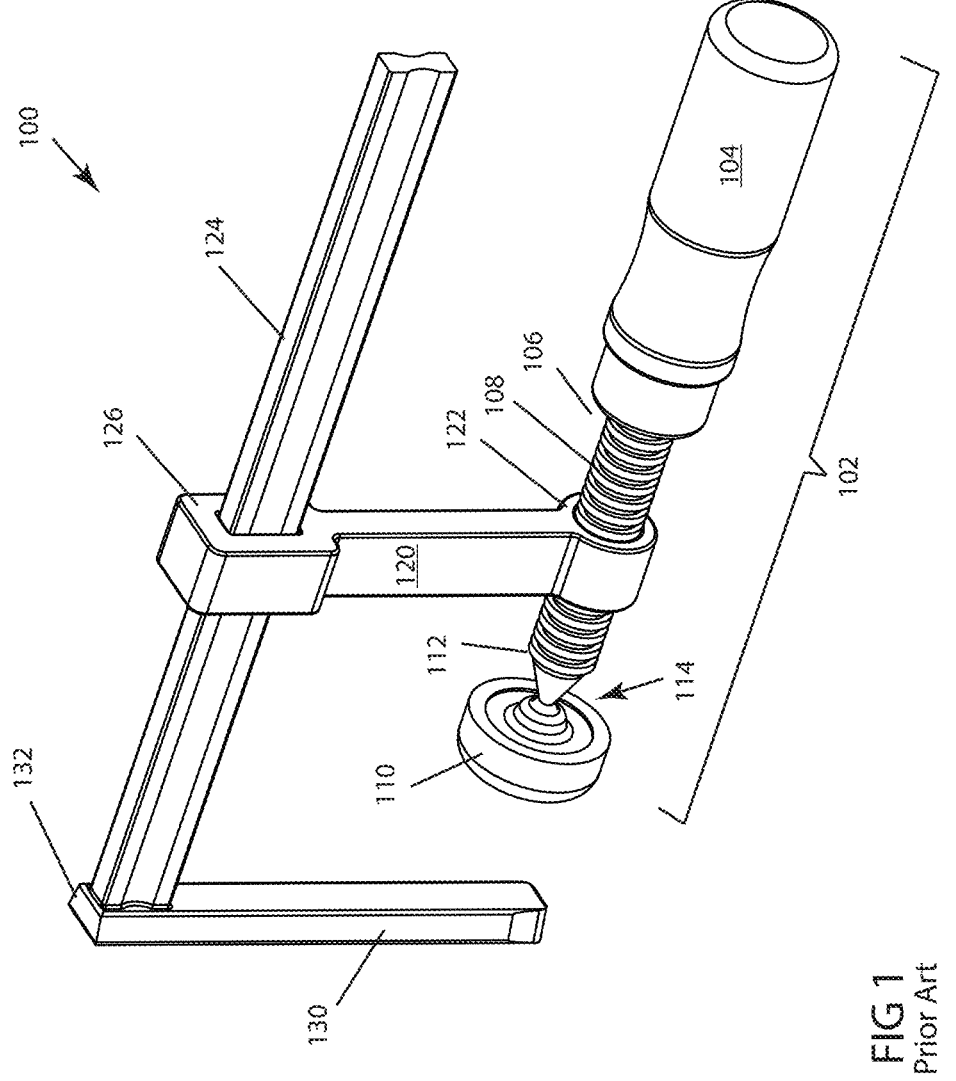
FIG. 1 is a perspective view of a prior art clamping device.

FIG. 1 shows a prior art clamping device 100 that is disclosed in U.S. Pat. No. 10,099,398 to Wang and which is incorporated in its entirely herein by reference. The prior art clamping device 100 includes a component engagement member 102 that may further include a handle 104 affixed to one end 106 of a threaded shaft 108 and a clamp head 110 pivotally attached to the other end 112 of the threaded shaft 108. A ball and socket type joint 114 enables the clamp head 110 to pivot relative to the threaded shaft 108.

A guide arm 120 is provided in threaded engagement with the threaded shaft 108 at a first end 122 thereof and engages a first post 124 at a second end 126. The guide arm 120 is connected in linear sliding engagement with the first post 124 to accommodate different thicknesses of items to be clamped together. A second post 130 (also referred to herein as "clamping post") is attached to the first post 124 at substantially 90° and extends toward the clamp head 110.

When clamping two components together, the second post 130 is inserted into a channel of an auxiliary (or second) component to be clamped to a woodworking apparatus. The second or auxiliary component, which may be a wooden member with one or more channels, is positioned against a surface, such as a fence of a table or table saw or router table (or a first component), and the clamp head 110 is positioned against the first component by sliding the guide arm 120 along the first post 124 away from the first component, or sliding the component engagement member 102, including the clamp head 110 toward the first and second components. The handle 104 is then rotated thereby rotating the threaded shaft 108 so the clamp head 110 moves linearly toward the second post 130 securing the two components together. The threaded shaft 108 acts as a gear mechanism operatively connected to the guide arm 120 to facilitate relative movement of the clamp head 110, guide arm 120 and clamping post 130 to clamp to components together.

Figures 2A, 2B, 2C, 2D:
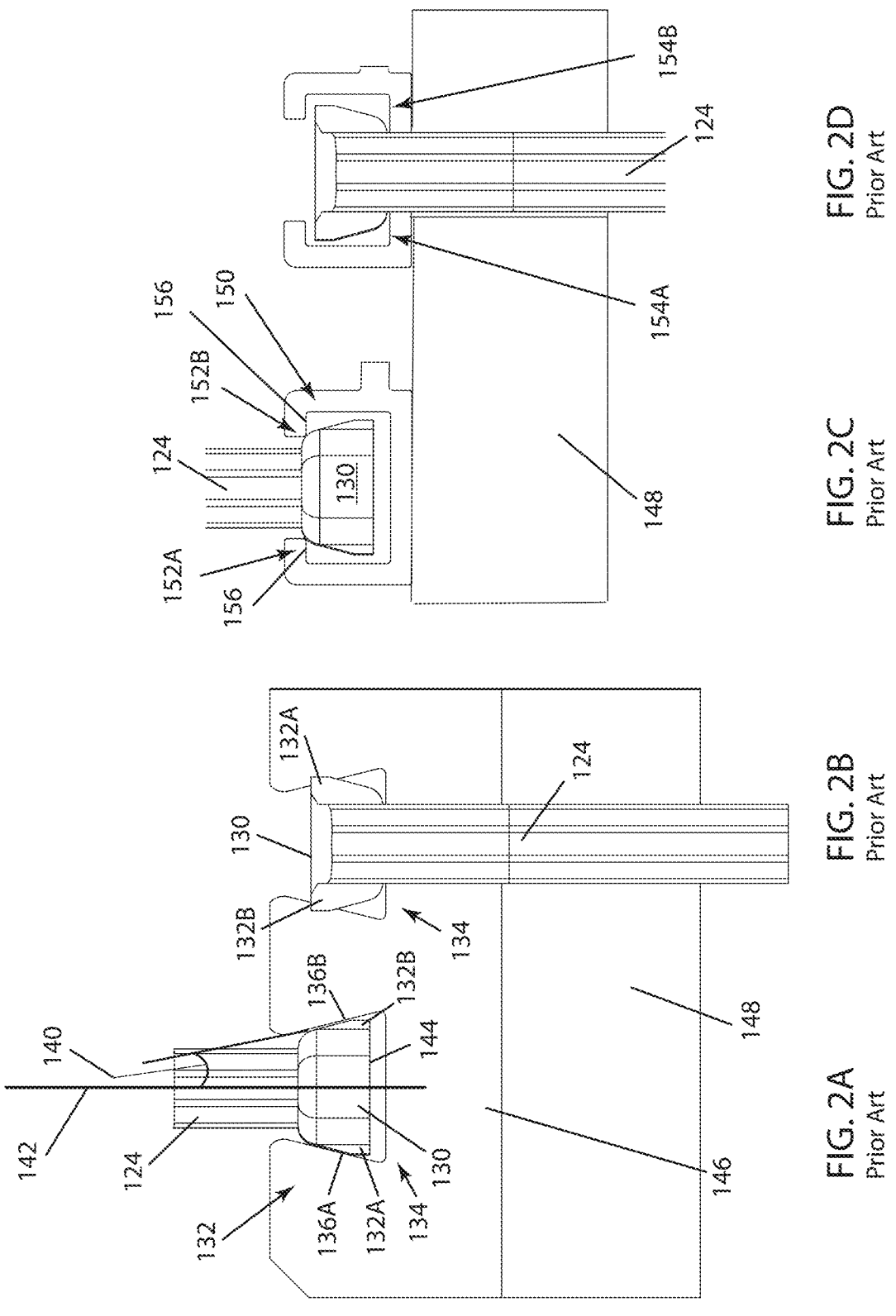
FIG. 2A to FIG. 2B are end views showing suitability of the prior art clamping device of FIG. 1 with a dovetail slot.
FIG. 2C to FIG. 2D are end views showing suitability of the prior art clamping device of FIG. 1 with a T-slot.

The second post 130 has a generally trapezoidal/dovetail cross-sectional configuration 132. The trapezoidal configuration 132 extends along at least a portion of the length of the second post 130 and facilitates a cooperative fit between the second post 130 and a dovetail slot 134 as can be seen in FIG. 2A. The trapezoidal configuration 132 includes sides 136A, 136B that form an angle 140 of approximately 14° (+/−0.5°) relative to a line 142 that extends perpendicular to a back 144 of the second post 130. This shape conforms to a shape of a dovetail slot 134 formed using a dovetail router bit that is commonly and widely used by woodworking enthusiasts and professionals.

However, there are instances when it can be beneficial to install a clamping device upside-down in the dovetail slot 134 or in slots having different shapes. As can be seen in FIG. 2B, the trapezoidal configuration 132 would not fit upside-down in the dovetail slot 134. Such an installation could be used to clamp a working panel 146 having the dovetail slot 134 to an underlying table 148.

As can be seen in FIG. 2C, the trapezoidal configuration 132 may fit upright into a T-slot 150, but corners 152A, 152B of the T-slot 150 are the only contact points with an inside surface 156 the T-slot 150. All the clamping force between the clamping post 130 and the T-slot 150 is concentrated in the corners 152A, 152B. This creates stress points that may damage the second post 130, the T-slot 150, or both. In addition, this contact does not provide for proper alignment between the second post 130 and the T-slot 150. Consequently, the first post 124 can tilt left or right as shown in FIG. 2C, which may be undesirable.

As can be seen in FIG. 2D, the trapezoidal configuration 132 may fit upside-down into a T-slot 150, but again, corners 154A, 154B of the T-slot 150 are the only contact points with the T-slot. Hence, this creates stress points that may damage the second post 130, the T-slot 150, or both.

In light of the above, the present Inventor has generated dovetail profiles for a reversible clamping arm that enables the clamping arm to be used upright and upside-down in a dovetail slot. The present inventor has also generated T-slot profiles for a clamping arm that enables the clamping arm to be used upright and upside-down in a T-slot. The clamping devices disclosed herein can have a dovetail profile, a T-slot profile, or both profiles.

Figure 3:
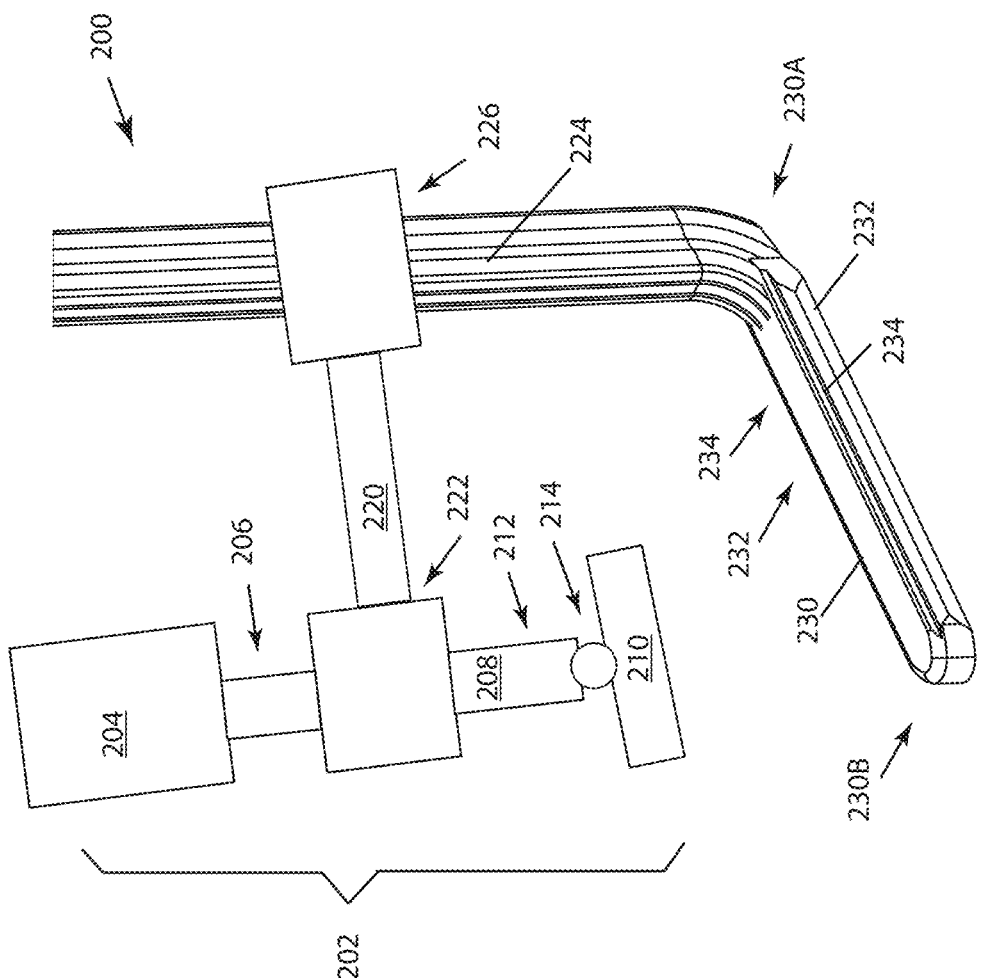
FIG. 3 is a perspective view of an example embodiment of a clamping device disclosed herein.

FIG. 3 is a perspective view of an example embodiment of a clamping device 200 disclosed herein. Similar to the prior art clamping device 100 of FIG. 1, the clamping device 200 includes component engagement member 202, a handle 204 affixed to one end 206 of the threaded shaft 208 and a clamp head 210 pivotally attached to the other end 212 of the threaded shaft 208. The ball and socket type joint 214 enables the clamp head 210 to pivot relative to the threaded shaft 208. The guide arm 220 is provided in threaded engagement with the threaded shaft 208 at the first end 222 thereof and engages the first post 224 at the second end 226. The guide arm 220 is connected in linear sliding engagement with the first post 224 to accommodate different thicknesses of items to be clamped together. A first end 230A of the second post 230 (also referred to herein as "clamping post") is attached to the first post 224 at substantially 90° and extends toward the clamp head 210. A second end 232B of the second post 230 is disposed opposite the first end 230A and opposite the clamp head 210. A portion of the second post 230 includes a dovetail shape like that of the prior art clamping device 100. Embodiments of the clamping device 200 disclosed herein can vary just like embodiments of the prior art clamping device 100 can vary as disclosed in U.S. Pat. No. 10,099,398 to Wang.

In addition to having a portion with the dovetail shape, the second post 230 of the clamping device 200 disclosed herein has at least one of relief features 232 and notches 234. The relief features 232 and the notches 234 extend all the way along the second post from the first end 230A to the second end 230B. As detailed below, the relief feature 232 enables the clamping device 200 to be installed upside-down in a dovetail slot, and the notches 234 enable the clamping device 200 to be secured installed upright in a T-slot without concentrating stresses in the corners of the T-slot. Moreover, when used together, the relief feature 232 and the notches 234 enable this functionality without interfering with each other.

Figures 4A, 4B:
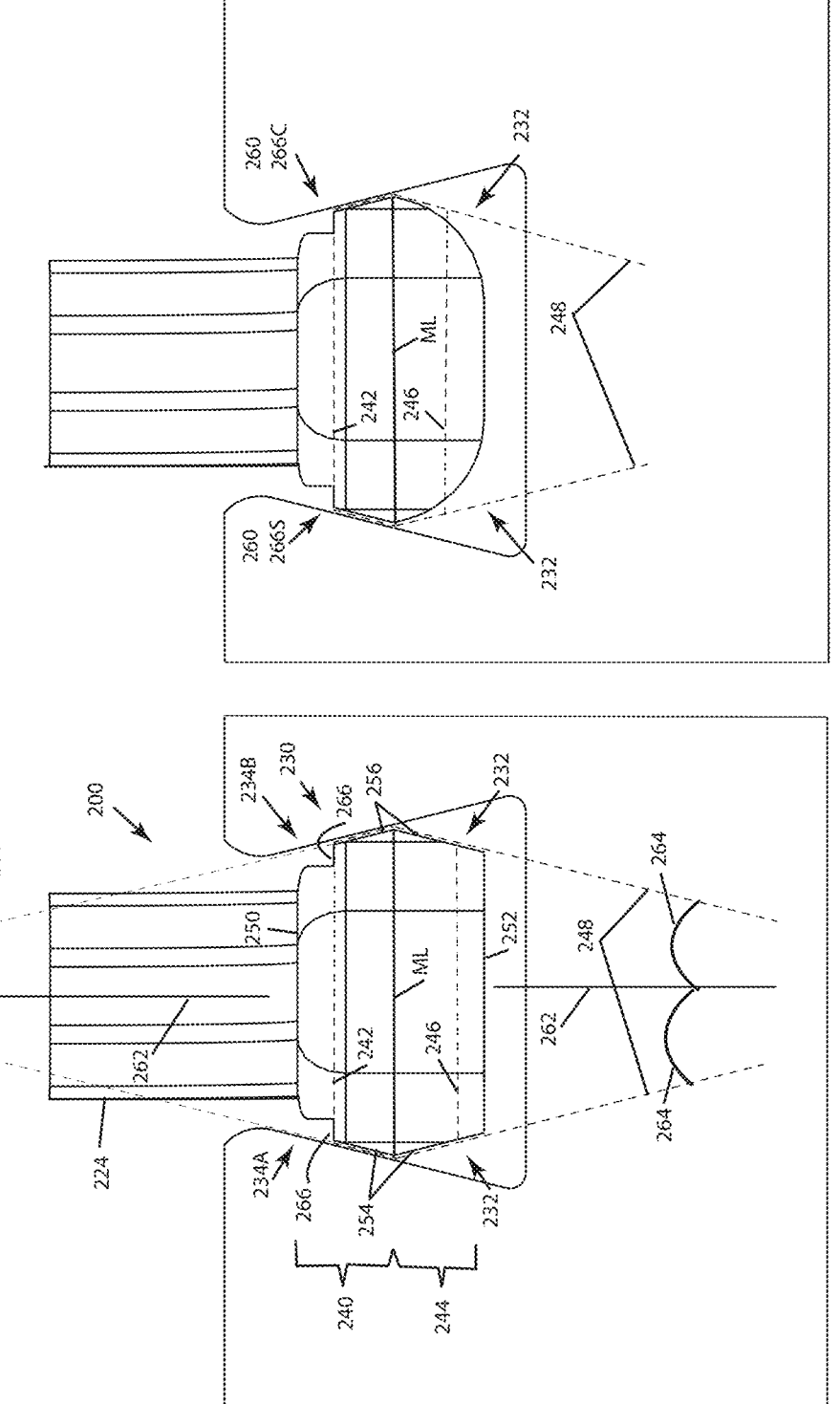
FIG. 4A is an end view of an example embodiment of a clamping device disclosed herein.
FIG. 4B is an end view of an alternate example embodiment of a clamping device disclosed herein.

FIG. 4A is an end view of an example embodiment of a clamping device 200 disclosed herein. When seen in the end view, and also in a cross-sectional view, the second post 230 includes a proximate portion 240 that is closer to the clamp head 210 and that includes an upright frustoconical shape 242 that tapers inward toward the clamp head 210. The second post 230 further includes a distal portion 244 that is disposed away from the clamp head 210 relative to the proximate portion 240 and that fits within a taper 248 defined by an upside-down frustoconical shape 246 that is a mirror image (about mirror line ML) of the upright frustoconical shape 242 of the proximate portion 240.

The second post 230 includes a top side 250 that faces toward the clamp head 210, a back side 252 opposite the top side 250, and a first side 254 and a second side 256, each connecting the top side 250 to the back side 252. The top side 250 and the back side 252 may be flat or include flat portions. In the proximate portion 240, each side 254, 256 forms an angle 260 with a reference line 262 that is perpendicular to the back side 252 and to the mirror line ML. The angle 260 may be between 13.5° to 14.5° to conform to the dovetail shape of a slot formed by a conventional dovetail bit.

In the distal portion 244, each side 254, 256 forms an angle 264 with the reference line 262 that is perpendicular to the back side 252. To fit within the taper 248 of the upside-down frustoconical shape 246 that is a mirror image of the upright frustoconical shape 242 of the proximate portion 240, the angle 264 is not less than 13.5°. However, the angle 264 may be greater than 13.5°, up to 90° (at 90° the distal portion would not be present) or even greater (in which case the proximate portion may have a hollow interior), and still be within the taper 248. Moreover, the sides 254, 256 need not be straight. For example, as shown in FIG. 4B, the sides 254, 256 may be rounded. Other shapes are possible so long as the distal portion 244 remains within the taper 248. The straight, rounded, or other shaped portions of the sides 254, 256 that remain within the taper 248 are deemed the relief features because, when compared to the second post 130 of the prior art clamping device 100, they are relieved back from the bottom corners 132A, 132B of the trapezoidal configuration 132 (see FIG. 2A).

As can be seen in FIG. 2B, it is these bottom corners 132A, 132B that prevent the second post 130 from being able to fit into the dovetail slot 134 upside-down. Removing the bottom corners 132A, 132B from the second post 130 enables the second post 230 of the clamping device 200 to fit into dovetail slots upside-down as can be seen in FIG. 5B et al.

Figures 6A, 6B, 6C, 6D:
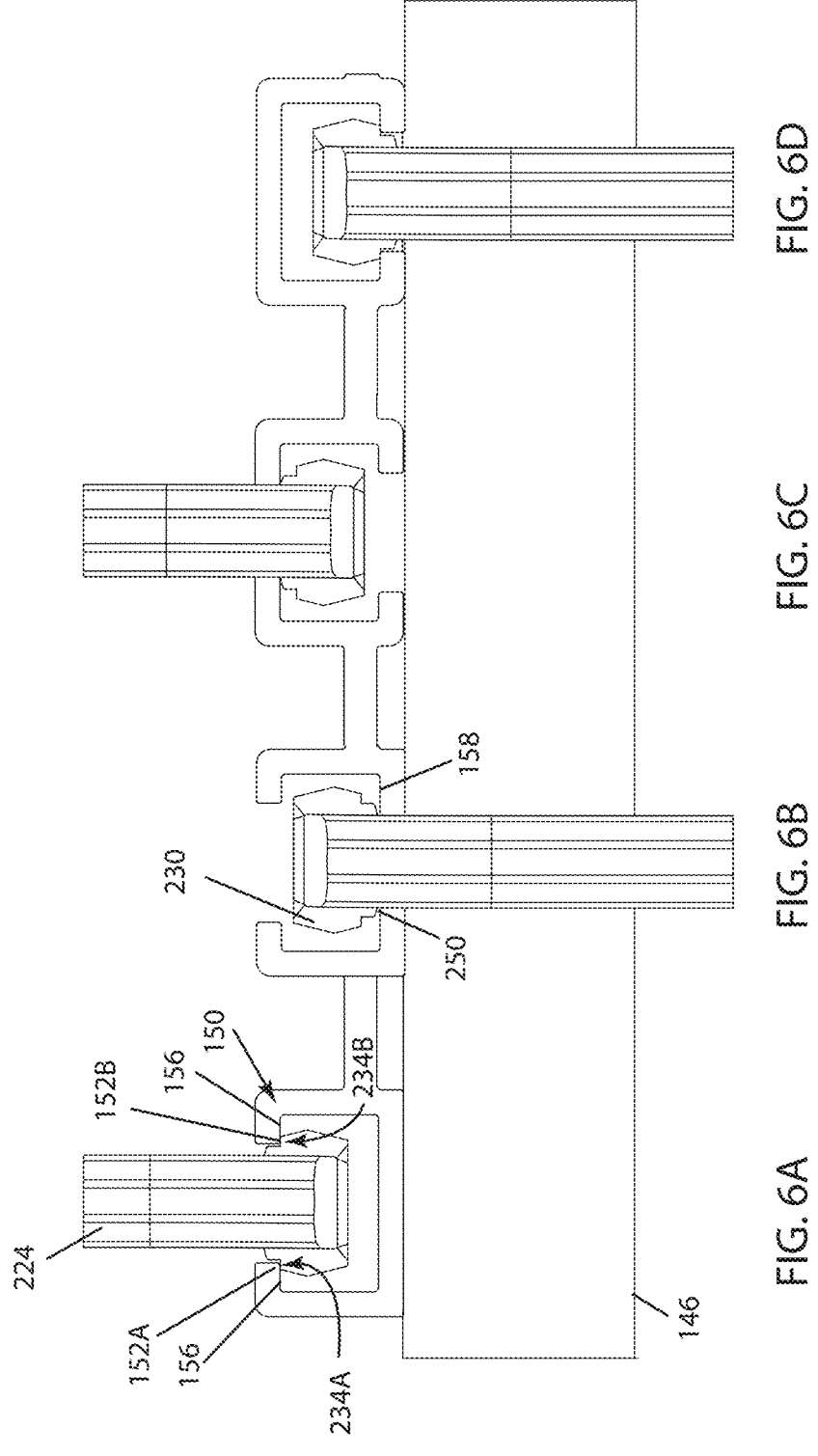
FIG. 6A to FIG. 6D are end views showing suitability of the clamping device of FIG. 3 with a T-slot.

As can also be seen in FIG. 4A, the second post 230 includes a notch 234A where the first side 254 meets the top side 250 and a notch 234B where the second side 256 meets the top side 250. Each notch 234A, 234B is configured to receive a respective corner 152A, 152B of the T-slot 150. Each notch 234A, 234B includes a contact feature 266 that contacts the inside surface 156 of a T 302 slot as shown in FIG. 6A et al. In the embodiment of FIG. 4A, the contact feature 266 is a flat surface and the two flat surfaces are coplanar with each other. However, the contact feature 266 can be a ridge like the symmetric ridge 268S or an outwardly canted ridge 268C (with a peak of the ridge disposed further out) shown in FIG. 4B. Other shapes suitable for a T-slot can be used for the contact feature 266 so long as the contact feature 266 provides suitable contact with the inside surface 156 of the T-slot 150. In the embodiment shown in FIG. 4A et al., the notches 234A, 234B are 90-degree notches.

Figures 5A, 5B, 5C, 5D:
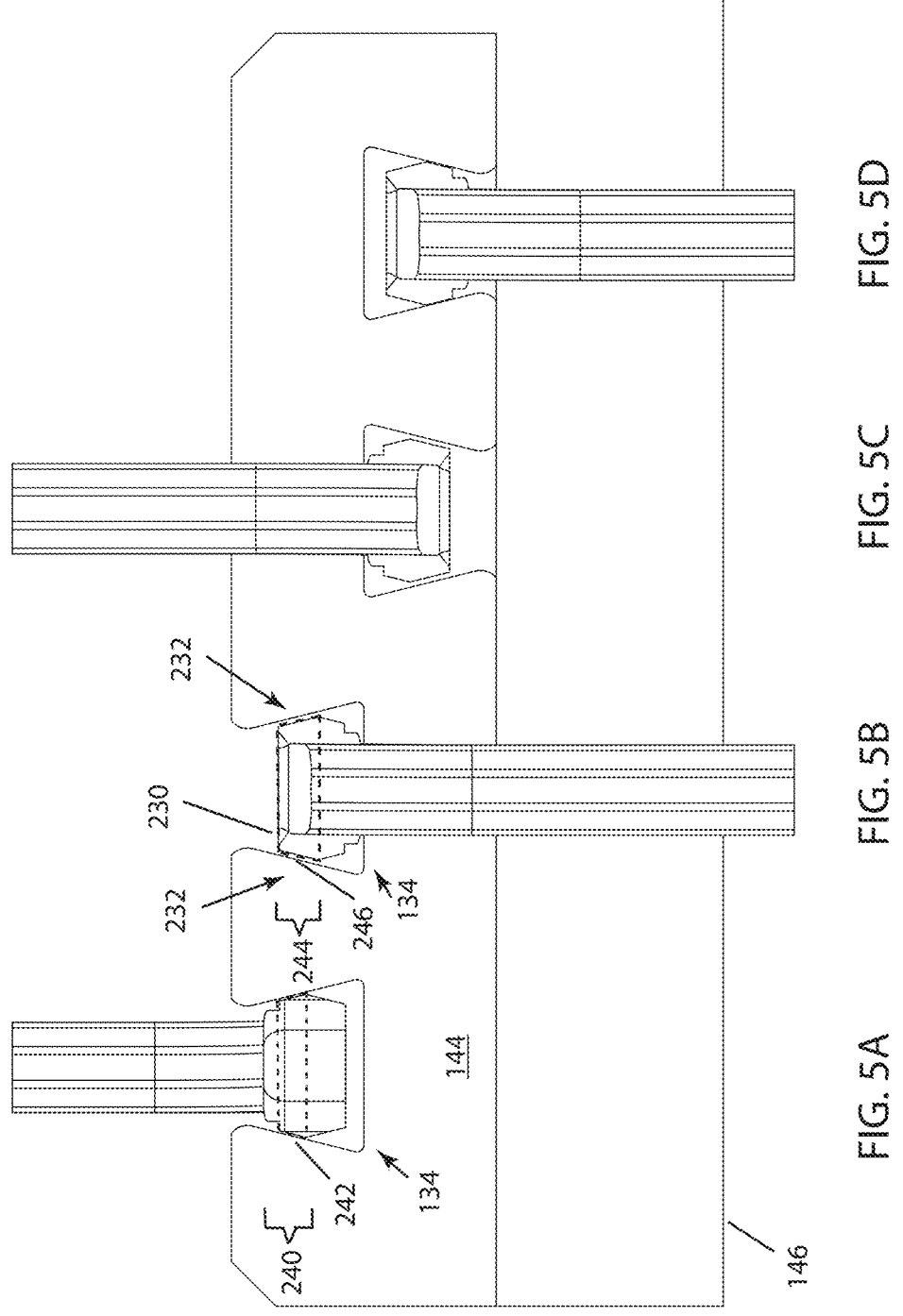
FIG. 5A to FIG. 5D are end views showing suitability of the clamping device of FIG. 3 with a dovetail slot.

FIG. 5A shows how the upright frustoconical shape 242 of the proximate portion 240 enables the upright clamping device 200 to remain compatible with a dovetail slot 134 disposed in a top of the working panel 146.

FIG. 5B shows how the mirrored "upside-down" frustoconical shape 246 of the distal portion 244 enables the upside-down clamping device 200, (e.g., a reversible, reversed clamping device), to remain compatible with a dovetail slot 134 disposed in a top of the working panel 146. Specifically, the relief features 232 enable the second post 230 to fit into the dovetail slot 134 without interference.

FIG. 5C and FIG. 5D show the same capabilities of the clamping device 200 shown in FIG. 5A and FIG. 5B for dovetail slots 134 disposed in a bottom of the working panel 146.

FIG. 6A shows how the notches 234A, 234B of the proximate portion 240 enable the upright clamping device 200 to be compatible with a T-slot 150 disposed in a top of the working panel 146. Specifically, the notches 234A, 234B receive therein the corners 152A, 152B. In particular, the flat contact feature 266, which is a flat surface as shown in FIG. 6A, contacts the inside surface 156 of the T-slot 150. This cooperative fit ensures the first post 224 remains vertical and perpendicular to the inside surface 156 of the T-slot 150.

FIG. 6B shows that the top side 250 cooperates with a bottom surface 158 of the T-slot 150 to provide a suitable, perpendicular fit of the second post 230 in the T-slot 150.

FIG. 6C and FIG. 6D show the same capabilities of the clamping device 200 shown in FIG. 6A and FIG. 6B for upside-down T-slots 150.

FIG. 7A to FIG. 7D are end views of another alternate example embodiment of a clamping device 700 disclosed herein in which the second post 730 is differently shaped. The second post 730 of this embodiment includes the relief features 232 but does not include the notches 234A, 234B.

Figures 7A, 7B, 7C, 7D:
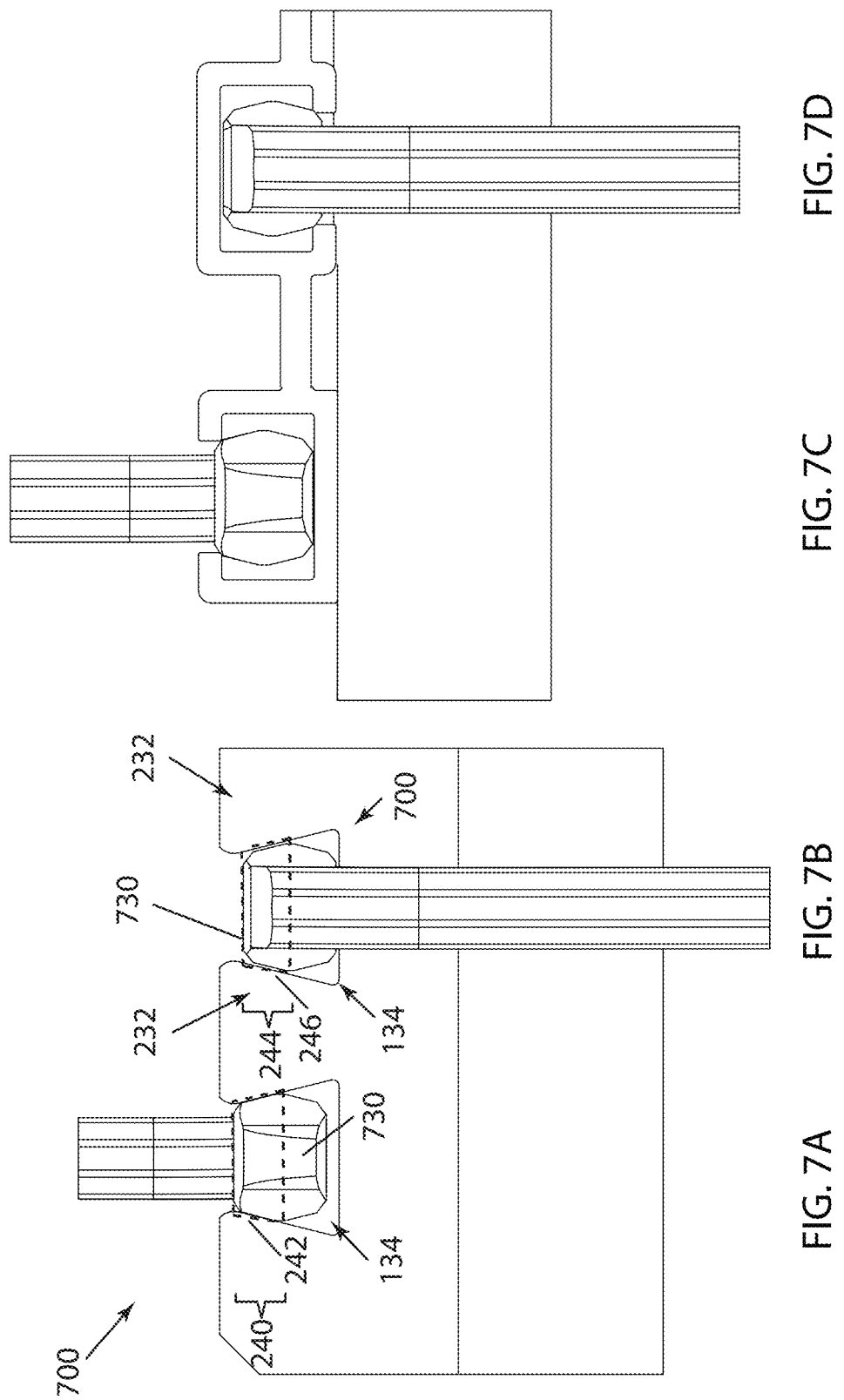
FIG. 7A to FIG. 7B are end views of another alternate example embodiment of a clamping device disclosed herein and its suitability with a dovetail slot.
FIG. 7C to FIG. 7D are end views of the clamping device of FIG. 7A and its suitability with a T-slot.

As with the embodiment of FIG. 5A, FIG. 7A shows how the upright frustoconical shape 242 of the proximate portion 240 enables the upright clamping device 200 to remain compatible with a dovetail slot 134 disposed in a top of the working panel 146.

As with the embodiment of FIG. 5B, FIG. 7B shows how the mirrored "upside-down" frustoconical shape 246 of the distal portion 244 enables the upside-down clamping device 200 to remain compatible with a dovetail slot 134 disposed in a top of the working panel 146. Specifically, the relief features 232 enable the second post 230 to fit into the dovetail slot 134 without interference.

However, as can be seen in FIG. 7C and FIG. 7D and unlike the embodiment of FIGS. 6A and 6B, the lack of notches 234A, 234B creates the situation described in relation to the prior art clamping device 100 as shown in FIG. 2C. Specifically, the lack of notches creates stress points and does not provide the proper alignment between the second post 230 and the T-slot 150.

FIG. 8A to FIG. 8D are end views of yet another alternate example embodiment of a clamping device 800 disclosed herein in which the second post 830 is differently shaped. The second post 830 of this embodiment includes the notches 234A, 234B but does not include the relief features 232.

Figures 8A, 8B, 8C, 8D:
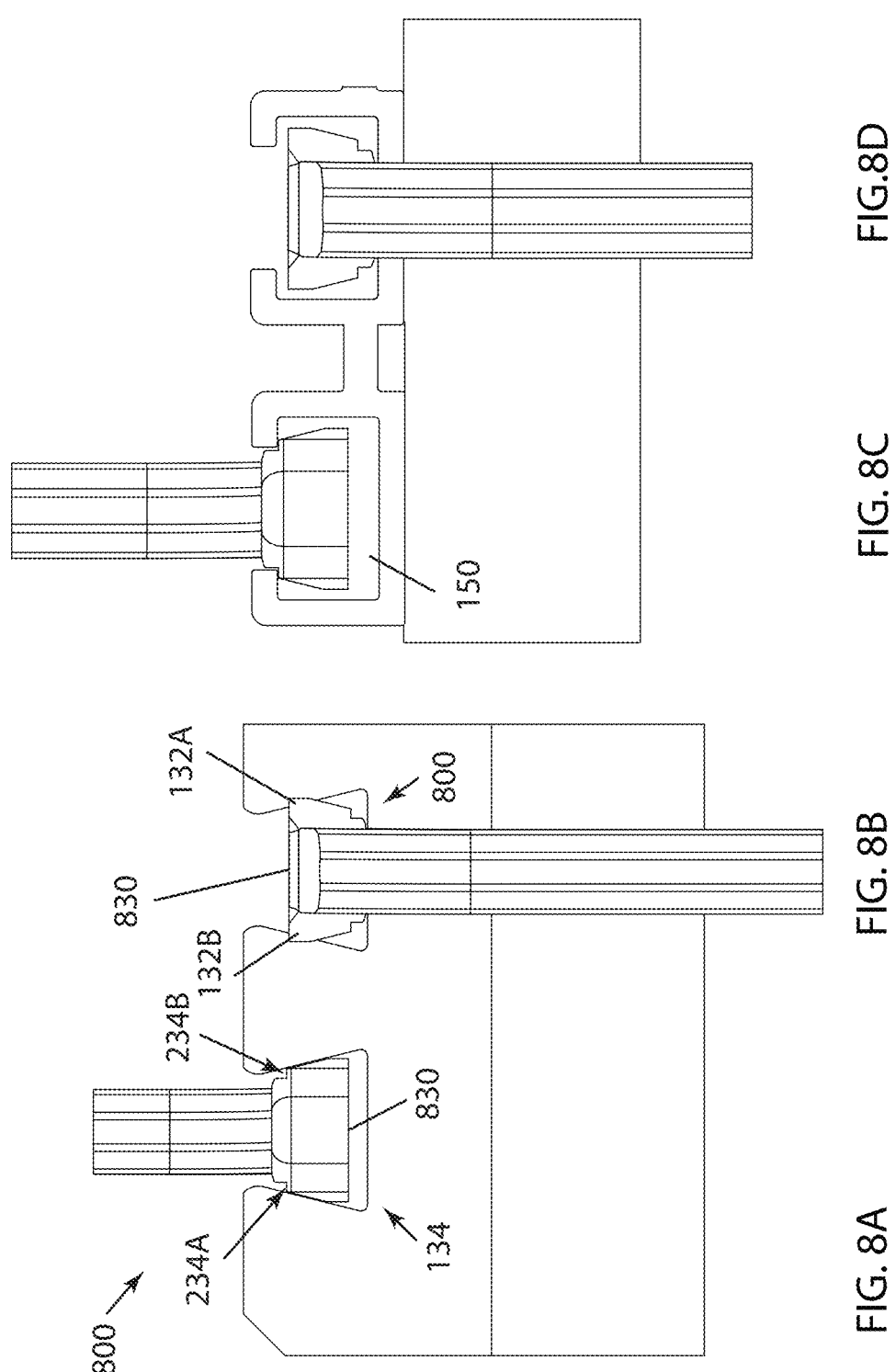
FIG. 8A to FIG. 8B are end views of yet another alternate example embodiment of a clamping device disclosed herein and its suitability with a dovetail slot.
FIG. 8C to FIG. 8D are end views of the clamping device of FIG. 8A and its suitability with a T-slot.

FIG. 8A shows how the dovetail shape of the second post 830 of the upright clamping device 800 remains compatible with a dovetail slot 134 disposed in a top of the working panel 146. However, FIG. 8B shows the bottom corners 132A, 132B prevent the second post 830 from fitting into the dovetail slot 134 when the clamping device 800 is upside-down.

As with FIG. 6A to FIG. 6B, FIG. 8C to FIG. 8D show the notches 134A, 134B enable the second post 830 of this embodiment to be compatible with the T-slot 150.

Figures 9A, 9B, 9C, 9D:
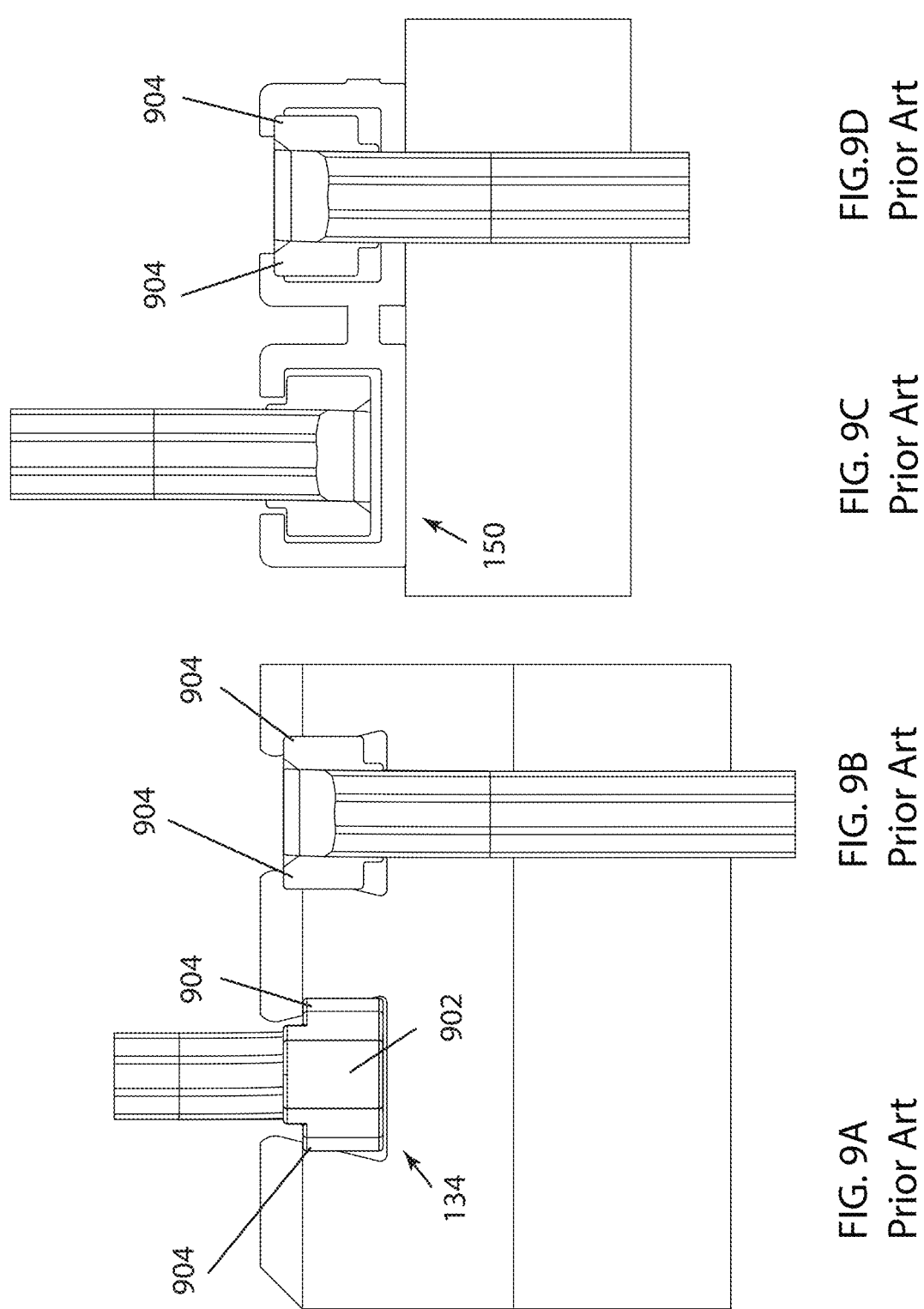
FIG. 9A to FIG. 9B are end views showing suitability of another prior art clamping device with a dovetail slot.
FIG. 9C to FIG. 9D are end views showing suitability of the prior art clamping device of FIG. 9A with a T-slot.

FIG. 9A to FIG. 9B are end views showing suitability of another prior art clamping device 900 having a notched rectangular shape 902 conventionally used with T-slots. As FIG. 9A and FIG. 9B show, corners 904 of the notched rectangular shape 902 interfere with the dovetail slot 134 in both the upright orientation and the upside-down orientation, which renders the clamping device 900 unsuitable for use with a dovetail slot.

As FIG. 9C shows, the notched rectangular shape 902 is suitable for an uptight T-slot 150 when the clamping device 900 is upright. As shown in FIG. 9D, at least two corners 904 of the notched rectangular shape 902 interfere with the T-slot 150 and render an upside-down clamping device 900 unsuitable for use with an upright T-slot 150.

In light of the above, it has been shown that a clamping device having both the relief features and notches, like those shown in FIG. 4A and FIG. 4B, is compatible with dovetail slots when in both an upright orientation and an upside-down orientation and is also compatible with T-slots when in both an upright orientation and an upside-down orientation. This is the widest variety of uses among all the disclosed embodiments and the prior art embodiments. The disclosed embodiments with relief features only or notches only, such as those in FIGS. 7A and 8A respectively, still provide a wider variety of uses than the prior art clamping devices of, for example, FIG. 2A and FIG. 9A. Consequently, the clamping devices shown herein represent an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. A multi-purpose utility clamp, comprising:
a clamp head and a handle operatively connected thereto;
a guide arm operatively connected to the clamp head at a first end of the guide arm;
a first post operatively connected to a second end of the guide arm, wherein the guide arm moves linearly relative to the first post; and
a second post at an end of the first post, disposed generally perpendicular to the first post, and parallel to the guide arm and comprising: a first end connected to the first post; and a second end, distal the first end, wherein the second end is disposed opposite the clamp head;
wherein the second post comprises: a top side that faces toward the clamp head; a back side opposite the top side; and a first side and a second side, each connecting the top side to the back side; and
wherein a proximate portion of a cross section of the second post that is closer to the clamp head defines an upright frustoconical shape that tapers inward toward the clamp head, and wherein a distal portion of the cross section is disposed away from the clamp head and defines an upside-down frustoconical shape that is a mirror image of the upright frustoconical shape of the proximate portion.

2. The multi-purpose utility clamp of claim 1, wherein in the upright frustoconical shape and in the upside-down frustoconical shape the first side and the second side are each disposed at an angle of 13.5° to 14.5° relative to a reference line that is perpendicular to the back side of the second post.

3. The multi-purpose utility clamp of claim 1, wherein the proximate portion further comprises: a first ninety-degree concave notch connecting the first side to the top side; and a second ninety-degree concave notch connecting the second side to the top side, wherein each concave notch is configured to receive therein a respective corner of a T-slot opening.

4. The multi-purpose utility clamp of claim 1, wherein outside corners of the proximate portion further comprises: a first ninety-degree concave notch between the first side and the top side; and a second ninety-degree concave notch between the second side and the top side, wherein each notch comprises a respective flat surface that is disposed below the top side and that faces toward the clamp head, and wherein the respective flat surfaces are disposed in a common plane.

5. A multi-purpose utility clamp, comprising:
a clamp head and a handle operatively connected thereto;
a guide arm operatively connected to the clamp head at a first end of the guide arm;
a first post operatively connected to a second end of the guide arm, wherein the guide arm moves linearly relative to the first post; and
a second post at an end of the first post, disposed generally perpendicular to the first post, and parallel to the guide arm and comprising: a first end connected to the first post; and a second end, distal the first end, wherein the second end is disposed opposite the clamp head;
wherein the second post comprises: a top side that faces toward the clamp head; a back side opposite the top side; and a first side and a second side, each connecting the top side to the back side;

wherein a proximate portion of a cross section of the second post is closer to the clamp head, and wherein a distal portion of the cross section is disposed away from the clamp head; and
wherein in the distal portion the first side, the second side, and the back side define an upside-down frustoconical shape that tapers inward away from the clamp head, wherein in the upside-down frustoconical shape the first side and the second side are each disposed at an angle of 13.5° to 14.5° relative to a reference line that is perpendicular to the back side of the second post; and
wherein in the proximate portion the first side, the second side, and the top side define an upright frustoconical shape that tapers inward toward the clamp head, and wherein in the upright frustoconical shape the first side and the second side are each disposed at an angle of 13.5° to 14.5° relative to the reference line that is perpendicular to the back side of the second post.

6. The multi-purpose utility clamp of claim 5, wherein corners of the cross section nearest the clamp head each comprise a respective ninety-degree concave notch that is disposed below the top side and that extends along an entire length of the top side.

7. A multi-purpose utility clamp, comprising:
a clamp head and a handle operatively connected thereto;
a guide arm operatively connected to the clamp head at a first end of the guide arm;
a first post operatively connected to a second end of the guide arm, wherein the guide arm moves linearly relative to the first post; and
a second post at an end of the first post, disposed generally perpendicular to the first post, and parallel to the guide arm and comprising: a first end connected to the first post; and a second end, distal the first end, wherein the second end is disposed opposite the clamp head; and
wherein a proximate portion of a cross section of the second post that is closer to the clamp head comprises: an upright frustoconical shape that tapers inward toward the clamp head,
wherein corners of the proximate portion nearest the clamp head each comprise a respective ninety-degree concave notch recessed thereinto; and
wherein a distal portion of the cross section is disposed away from the clamp head and defines an upside-down frustoconical shape that is a mirror image of the upright frustoconical shape of the proximate portion.

8. The multi-purpose utility clamp of claim 7, wherein in the upright frustoconical shape a respective first side and a respective second side thereof are each disposed at an angle of 13.5° to 14.5° relative to a reference line that is perpendicular to a back side of the second post that is opposite the clamp head.

9. The multi-purpose utility clamp of claim 8, wherein in the distal portion of the cross section a respective first side and a respective second side are each disposed at an angle of at least 13.5° relative to the reference line that is perpendicular to a back side of the second post that is opposite the clamp head.

10. The multi-purpose utility clamp of claim 7, wherein each contact notch comprises a respective flat contact surface disposed below a top side of the second post, and wherein the respective flat surfaces are coplanar with each other and face toward the clamp head.

* * * * *